(12) United States Patent
Kim et al.

(10) Patent No.: US 11,879,509 B2
(45) Date of Patent: Jan. 23, 2024

(54) SYSTEM FOR OPERATING AND LUBRICATING CLUTCH OF WORK VEHICLE

(71) Applicant: Daedong Corporation, Daegu (KR)

(72) Inventors: Bong Jae Kim, Gyeongsangnam-do (KR); Gi Sun Shim, Gyeongsangnam-do (KR)

(73) Assignee: Daedong Corporation, Daegu (KR)

( * ) Notice: Subject to any disclaimer, the term of this patent is extended or adjusted under 35 U.S.C. 154(b) by 0 days.

(21) Appl. No.: 18/303,550

(22) Filed: Apr. 19, 2023

(65) Prior Publication Data

US 2023/0341013 A1 Oct. 26, 2023

(30) Foreign Application Priority Data

Apr. 20, 2022 (KR) ........................ 10-2022-0049107

(51) Int. Cl.
*F16D 48/02* (2006.01)
*F16H 57/04* (2010.01)

(52) U.S. Cl.
CPC ......... *F16D 48/02* (2013.01); *F16H 57/0473* (2013.01); *F16D 2048/029* (2013.01); *F16D 2048/0221* (2013.01); *F16D 2300/06* (2013.01); *F16D 2500/1026* (2013.01); *F16D 2500/1045* (2013.01); *F16D 2500/10412* (2013.01)

(58) Field of Classification Search
CPC ..................... F16H 2037/044; F16H 2037/045
See application file for complete search history.

(56) References Cited

U.S. PATENT DOCUMENTS

| | | | | |
|---|---|---|---|---|
| 3,823,801 A | * | 7/1974 | Arnold | B63H 23/30 |
| | | | | 192/85.63 |
| 5,024,306 A | * | 6/1991 | Fukui | B60W 10/10 |
| | | | | 192/48.601 |
| 6,199,441 B1 | * | 3/2001 | Kanenobu | F16H 3/093 |
| | | | | 192/85.63 |
| 2007/0151376 A1 | * | 7/2007 | Matsufuji | F15B 13/0814 |
| | | | | 74/15.66 |

FOREIGN PATENT DOCUMENTS

JP          2005162210 A      6/2005

* cited by examiner

*Primary Examiner* — Timothy Hannon
(74) *Attorney, Agent, or Firm* — YOU & IP, LLC; Wansik You

(57) ABSTRACT

Proposed is a system for operating and lubricating a clutch of a work vehicle. The system includes a forward-backward switching clutch portion connected to a first transmission hydraulic line, a main transmission clutch portion connected to the first transmission hydraulic line so as to be disposed in parallel with the forward-backward switching clutch portion, an auxiliary transmission clutch portion connected to a second transmission hydraulic line disposed in parallel with the first transmission hydraulic line, and a lubricating oil supply portion configured to supply oil as a lubricant to each clutch friction element. The lubricating oil supply portion includes a clutch lubrication valve unit, and is configured to always allow oil supply to the clutch friction elements of each of the main transmission clutch portion and the auxiliary transmission clutch portion, and is configured to intermittently allow oil supply to the clutch friction element of the forward-backward switching clutch portion.

9 Claims, 5 Drawing Sheets

SYSTEM FOR OPERATING AND LUBRICATING CLUTCH OF WORK VEHICLE

CROSS REFERENCE TO RELATED APPLICATION

The present application claims priority to Korean Patent Application No. 10-2022-0049107, filed Apr. 20, 2022, the entire contents of which are incorporated herein for all purposes by this reference.

BACKGROUND OF THE INVENTION

Field of the Invention

The present disclosure relates to a system for operating and lubricating a clutch. More particularly, the present disclosure relates to a system for operating and lubricating a clutch of a work vehicle in which forward-backward switching and shifting are realized by a plurality of hydraulic clutches operated with a hydraulic pressure.

Description of the Related Art

A conventional transmission for a work vehicle may be classified into a manual transmission and a hydraulic transmission. The manual transmission is configured such that a driver is capable of changing a rotation direction and a speed of a driving force by controlling a transmission lever so that a shifter is moved, and the hydraulic transmission is configured such that a rotation direction and a speed of a driving force is capable of being changed according to an operation of a hydraulic clutch that is as an alternative configuration for the shifter in the manual transmission.

Among the manual transmission and the hydraulic transmission, the manual transmission is configured to change a rotation direction and a speed of a driving force by moving the shifter through the transmission lever, so that a configuration of the manual transmission is complicated, and there is a problem that noise occurs during shifting. In addition, there is a problem that an operation fatigue is high since shifting is entirely realized by a force of a driver. Therefore, recently, a method of using a hydraulic pressure for vehicle shifting, i.e., a method of using a hydraulic transmission, has been universally trending.

A conventional hydraulic transmission applied in a working vehicle includes a plurality of clutches operated by a hydraulic valve (a solenoid-driven type direction control valve). The plurality of clutches may include a forward-backward switching clutch configured to determining a rotation direction of a driving force, and may include at least two main transmission clutches and at least one auxiliary transmission clutch that are configured to primarily and secondarily shift a rotation speed of the driving force in which the rotation direction is determined.

Due to a mechanism in which clutches used in a transmission are configured to realize shifting by closely contacting a plurality of friction elements divided into a drive-side friction element and a driven-side friction element to each other, a lot of heat is generated when the clutches are operated, and wear of the clutches occurs. Heat and wear that occur when the clutches are operated are main causes of a malfunction and a reduced life of the clutches. Therefore, appropriate lubricating for wear prevention, cooling, and so on is required.

Accordingly, the hydraulic transmission applied to the conventional work vehicle generally includes a lubrication circuit configured to always supply some of oil (a working fluid) operating the clutches to the friction elements of each of the clutches (the forward-backward switching clutch, the main transmission clutches, and the auxiliary transmission clutch), thereby preventing wear of the friction elements that constitute each of the clutches, and maintaining a clutch performance appropriately by absorbing a frictional heat.

In the clutches of the hydraulic transmission, the forward-backward switching clutch is required to be operated more sensitively than other clutches due to characteristics of the forward-backward switching clutch. In addition, a frequency of use of the forward-backward switching clutch is relatively low comparing to other clutches. Therefore, when the forward-backward switching clutch is always lubricated like other clutches, excessive lubrication may cause a malfunction due to drag or slip, and may adversely affect the clutch performance.

Document of Related Art (Patent Document 1) Japanese Patent Application Publication No. 2005-162210 (published on Jun. 23, 2005)

SUMMARY OF THE INVENTION

Accordingly, the present disclosure has been made keeping in mind the above problems occurring in the related art, and an objective of the present disclosure is to provide a system for operating and lubricating a clutch of a work vehicle, the system being capable of solving a problem in which excessive lubrication caused by always lubricating a forward-backward switching clutch adversely affects a clutch performance, the forward-backward switching clutch having a relatively high operation sensitivity and a relatively low frequency of use compared to other clutches.

In order to achieve the objective, according to an aspect of the present disclosure, there is provided a system for operating and lubricating a clutch of a work vehicle, the system including: a forward-backward switching clutch portion connected to a first transmission hydraulic line; a main transmission clutch portion connected to the first transmission hydraulic line such that the main transmission clutch portion is disposed in parallel with the forward-backward switching clutch portion in terms of a circuit; an auxiliary transmission clutch portion connected to a second transmission hydraulic line that is disposed in parallel with the first transmission hydraulic line in terms of a circuit; and a lubricating oil supply portion configured to supply oil as a lubricant supplied from the second transmission hydraulic line to each clutch friction element of the forward-backward switching clutch portion, the main transmission clutch portion, and the auxiliary transmission clutch portion, wherein the lubricating oil supply portion includes a clutch lubrication valve unit configured to control oil supply for each clutch friction element, and the clutch lubrication valve unit is configured such that oil supply to the clutch friction element of the main transmission clutch portion and to the clutch friction element of the auxiliary transmission clutch portion is always allowed and oil supply to the clutch friction element of the forward-backward switching clutch portion is intermittently allowed according to control of a control unit.

In addition, the system of the present disclosure may further include an input line configured to supply oil to the first transmission hydraulic line and the second transmission hydraulic line in which the oil is discharged from an oil pump and has a predetermined pressure, and the first transmission hydraulic line and the second transmission hydraulic line may branch out from an end of the input line.

In addition, each of the forward-backward switching clutch portion, the main transmission clutch portion, and the auxiliary transmission clutch may include: at least one double pack type clutch unit; and solenoid-driven type control valves provided at each clutch constituting the clutch unit, the control valves being configured to regulate feeding and draining of oil that is a working fluid according to control of the control unit.

In addition, the lubricating oil supply portion may be configured to allow oil supply to the clutch friction element of the forward-backward switching clutch portion according to a driving signal output by the control unit when the forward-backward switching clutch portion is operated.

Preferably, the lubricating oil supply portion may include: a lubricating oil supply line that branches out from the second transmission hydraulic line positioned in rear of the auxiliary transmission clutch portion with respect to a moving direction of oil; a clutch lubrication valve unit connected to the lubricating oil supply line and configured to regulate flow of oil that is to be supplied as the lubricant to the clutch friction elements of each of the forward-backward switching clutch portion, the main transmission clutch portion, and the auxiliary transmission clutch portion; a first lubrication line connecting the clutch lubrication valve unit to a clutch unit of the forward-backward switching clutch portion; and a second lubrication line connecting the clutch lubrication valve unit to each clutch unit of the main transmission clutch portion and the auxiliary transmission clutch portion.

Here, the clutch lubrication valve unit may include: a solenoid-driven type lubrication direction control valve having one inlet and two outlets; and a shuttle valve having two inlets and one outlet, the shuttle valve in which a check valve configured to be operated such that oil is moved only to the outlet of the shuttle valve is mounted at one of the two inlets, wherein the first lubrication line may be connected to one of the two outlets of the lubrication direction control valve, and the other of the two outlets of the lubrication direction control valve may be connected to one inlet of the shuttle valve positioned at an opposite side of the check valve, a bypass line that branches out from the first lubrication line may be connected to the other of the two inlets of the shuttle valve in which the check valve is mounted, and the second lubrication line may be connected to the outlet of the shuttle valve.

At this time, in a non-operation state in which there is no driving signal input by the control unit, the lubrication direction control valve may be operated such that the outlet connected to the shuttle valve is maintained to be opened, and may be operated such that the outlet toward the first lubrication line is opened according to a driving signal output by the control unit in conjunction with an operation of the forward-backward switching clutch portion.

In addition, the system of the present disclosure may further include a pressure-flow control unit mounted at a point where the lubricating oil supply portion is connected to the second transmission hydraulic line in terms of a circuit, the pressure-flow control unit being configured to form a pressure for a clutch engagement of the forward-backward switching clutch portion, the main transmission clutch portion, and the auxiliary transmission clutch portion, and the pressure-flow control unit being configured to supply a required flow rate to the lubricating oil supply portion.

At this time, in the pressure-flow control unit, a flow regulating valve having one inlet and two outlets and having an inner portion provided with an orifice and a relief valve disposed in front of the flow regulating valve with respect to a moving direction of oil may be configured as one valve unit shape.

According to an embodiment of the present disclosure, in the main transmission clutch portion and the auxiliary transmission clutch portion which do not require a high level of operation sensitivity and which have a relatively high frequency of use, a lubricating oil is always supplied thereto so that the main transmission clutch portion and the auxiliary transmission clutch portion are lubricated and cooled. Furthermore, in the forward-backward switching clutch portion which requires a relatively high level of operation sensitivity and which has a relatively low frequency of use, a lubricating oil is intermittently supplied thereto according to when the forward-backward switching clutch portion is operated so that the forward-backward switching clutch portion is lubricated and cooled.

In clutches of a hydraulic transmission, a forward-backward switching clutch is required to be operated more sensitively than other clutches due to characteristics of the forward-backward switching clutch. In addition, a frequency of use of the forward-backward switching clutch is relatively low comparing to other clutches. Therefore, in a conventional technology in which the forward-backward switching clutch is always lubricated like other clutches, there is a problem that excessive lubrication causes a malfunction due to drag or slip and the excessive lubrication adversely affects a clutch performance.

On the other hand, since the system of the present disclosure is configured such that oil that is a lubricant is supplied intermittently, unlike other clutch portions, to the clutch friction element of the forward-backward switching clutch portion having a relatively high operation sensitivity and a relatively low frequency of use, the problem of the conventional technology in which excessive lubrication of the forward-backward switching clutch portion causes a malfunction due to drag or slip and the excessive lubrication adversely affects a clutch performance may be prevented.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

Figure 1:
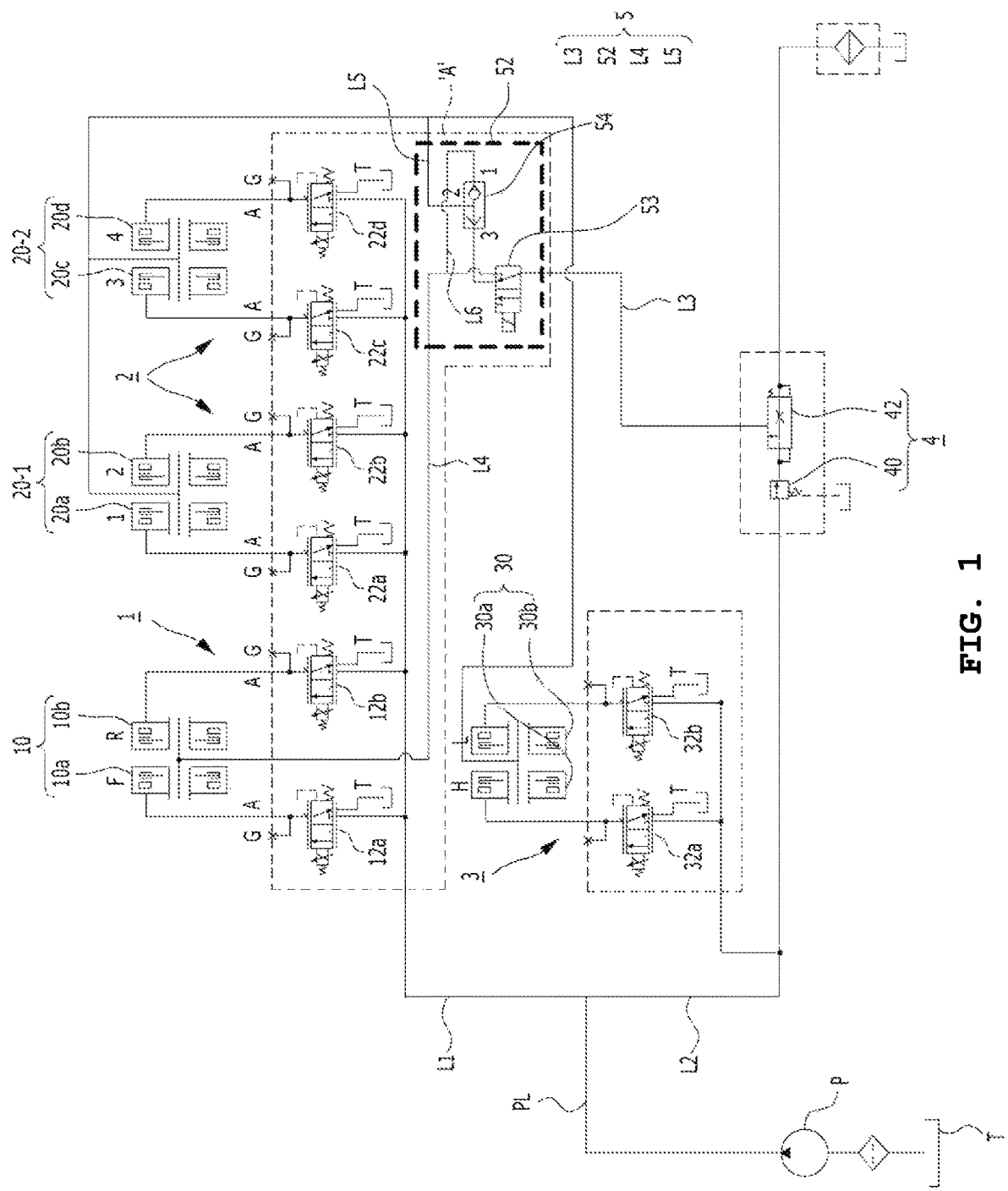
FIG. 1 is a hydraulic circuit diagram related to shifting and lubricating of a system for operating and lubricating a clutch of a work vehicle according to an embodiment of the present disclosure.

Hereinafter, an exemplary embodiment of the present disclosure will be described in detail.

The terms used in the present specification are only used to describe specific embodiments, and are not intended to limit the present disclosure. Singular expressions include plural expressions unless the context clearly indicates otherwise. It is to be understood that terms such as 'including', 'having', and so on are intended to indicate the existence of the features, numbers, steps, actions, elements, components, or combinations thereof disclosed in the specification, and are not intended to preclude the possibility that one or more other features, numbers, steps, actions, elements, components, or combinations thereof may exist or may be added.

In addition, terms 'first', 'second', and so on can be used to describe various elements, but the elements are not to be construed as being limited to the terms. The terms are only used for the purpose of distinguishing one element from another element.

In addition, the terms '. . . part', '. . . unit', '. . . module', and the like described herein may mean a unit for processing at least one function or operation, and they may be implemented in hardware, software, or a combination of hardware and software.

In the following description referring to the accompanying drawings, the same components are given the same reference numerals and are not repeatedly described. In describing the present disclosure, a detailed description of known technologies will be omitted when it may obscure the subject matter of the present disclosure.

Figure 2:
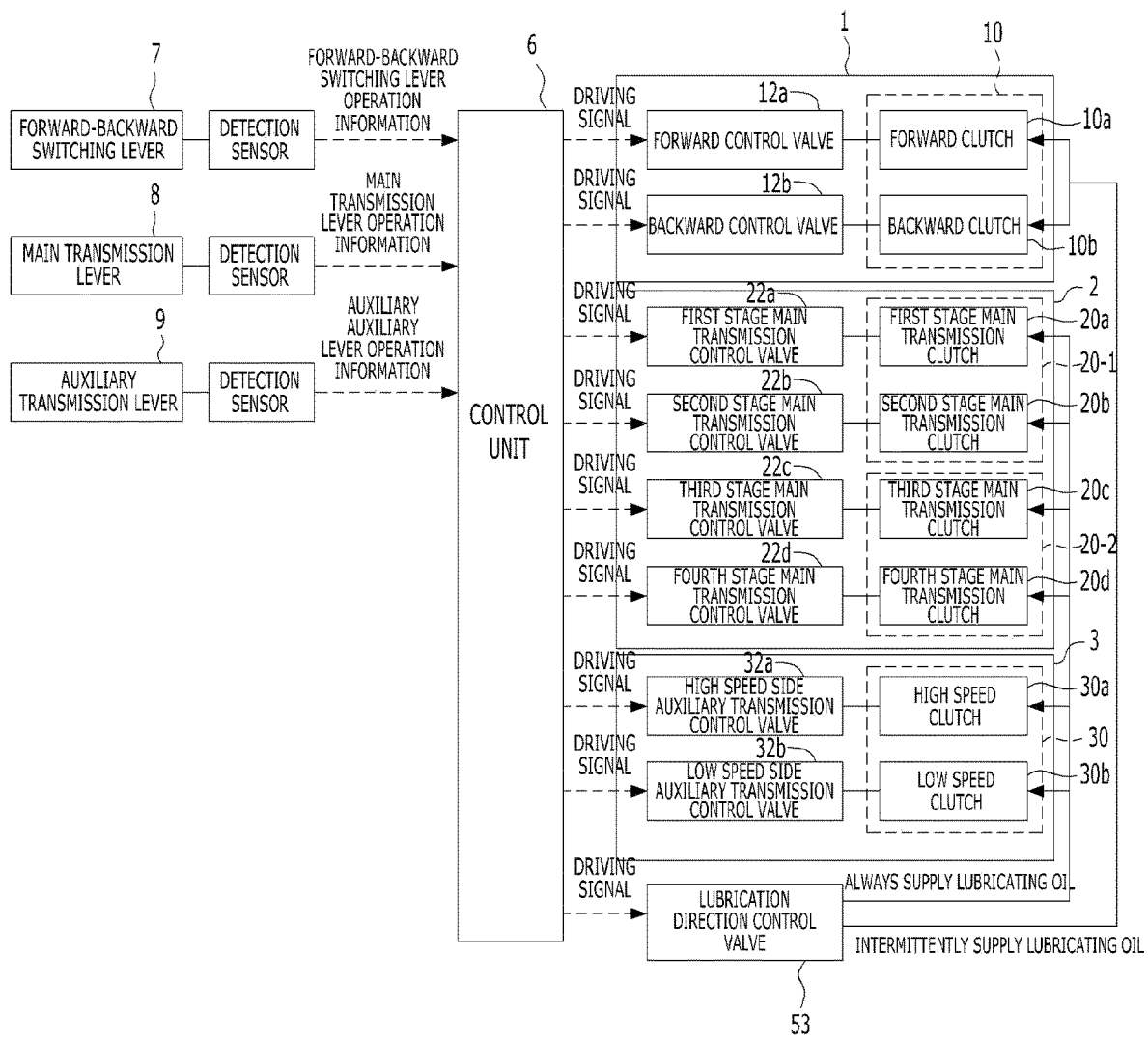
FIG. 2 is a system configuration view illustrating the system for operating and lubricating the clutch according to an embodiment of the present disclosure.

FIG. 1 is a hydraulic circuit diagram related to shifting and lubricating of a system for operating and lubricating a clutch of a work vehicle according to an embodiment of the present disclosure, and FIG. 2 is a system configuration view illustrating the system for operating and lubricating the clutch according to an embodiment of the present disclosure.

Referring to FIGS. 1 and 2, a system for operating and lubricating a clutch according to an embodiment of the present disclosure includes a forward-backward switching clutch portion 1 configured to determine a rotation direction of a driving force, at least two main transmission clutch portions 2 and at least one auxiliary transmission clutch portion 3 that are configured to primarily and secondarily shift a rotation speed of the driving force in which the rotation direction is determined, and a lubricating oil supply portion 5 configured to supply some of oil that is a working fluid as a lubricant to a clutch friction element of each clutch portion.

The forward-backward switching clutch portion 1 is connected to a first transmission hydraulic line L1. The forward-backward switching clutch portion 1 includes a double pack type forward-backward clutch unit 10 in which two clutches (a forward clutch 10a and a backward clutch 10b) operated by a hydraulic pressure are configured as one unit shape.

In addition, the forward-backward switching clutch portion 1 includes two control valves (referred to as a forward control valve 12a and a backward control valve 12b) that are provided so as to respectively correspond to the clutches 10a and 10b constituting the forward-backward clutch unit 10.

The forward control valve 12a and the backward control valve 12b may respectively be a solenoid-driven type direction control valve configured to control feeding and draining of oil for the corresponding clutches (10a and 10b), in which the oil is the working fluid. Each of the forward control valve 12a and the backward control valve 12b is selectively operated according to a driving signal output by a control unit 6 according to an operation of a forward-backward switching lever 7, thereby being switched so as to allow supply of oil that is the working fluid to the corresponding clutch.

For example, when the forward-backward switching lever 7 is operated to a forward side, the control unit 6 applies a driving signal to the forward control valve 12a at the time when related information (forward side operation information) is detected and, accordingly, the forward control valve 12a is switched in a direction that allows oil supply to the forward clutch 10a. As a result, the forward clutch 10a is engaged (clutch connected), so that an engine driving force is output in a forward direction.

Of course, as described above, the forward control valve 12a and the backward control valve 12b that are respectively connected to the forward clutch 10a and the backward clutch 10b are operated selectively according to a driving signal output by the control unit 6 according to an operation of the forward-backward switching lever 7. Therefore, when the forward control valve 12a is switched in a direction of engaging the forward clutch 10a, the backward control valve 12b is maintained in a switch state in which the backward clutch 10b is disengaged.

The two clutches (the forward clutch 10a and the backward clutch 10b) constituting the forward-backward switching clutch portion 1 may respectively be a multiple-plate type hydraulic clutch including a plurality of friction elements (reference numeral omitted). The plurality of friction elements may include at least two drive-side friction elements (clutch discs) disposed so as to be spaced apart from each other by a predetermined distance, and may include a driven-side friction element (a clutch plate) provided so as to be positioned between the drive-side friction elements.

The main transmission clutch portion 2 is also connected to the first transmission hydraulic line L1. Preferably, as illustrated in FIG. 1, the main transmission clutch portion 2 is connected to the first transmission hydraulic line L1 such that a parallel arrangement in terms of a circuit with the forward-backward switching clutch portion 1 is realized. The main transmission clutch portions 2 also include double pack type main transmission clutch units 20-1 and 20-2 in which two clutches (hereinafter, referred to as 'main transmission clutches') that are operated by a hydraulic pressure are configured as one unit shape.

The main transmission clutch units 20-1 and 20-2 in which two main transmission clutches are configured as one unit shape may include at least two main transmission clutch units 20-1 and 20-2. For example, as illustrated in FIG. 1, when two main transmission clutch units 20-1 and 20-2 are provided, a total of four main transmission clutches (a first stage main transmission clutch 20a, a second stage main transmission clutch 20b, a third stage main transmission clutch 20c, and a fourth stage main transmission clutch 20d) are provided and the number of a transmission stage has four stages. Each of the main transmission clutches 20a, 20b, 20c, and 20d are operated selectively according to a control of the control unit 6 so that a driving force is transmitted through any one of gear pairs among gear pairs having different gear ratios.

As illustrated in FIG. 1, control valves (a first stage main transmission control valves 22a, a second stage main transmission control valve 22b, a third stage main transmission control valve 22c, and a fourth stage main transmission control valve 22d) are respectively connected to the main transmission clutches 20a, 20b, 20c, and 20d. Similar to the forward-backward switching clutch portion 1 described above, the main transmission control valves 22a, 22b, 22c, and 22d may respectively be a solenoid-driven type direction control valve configured to control feeding and draining of oil for the corresponding main transmission clutches 20a, 20b, 20c, and 20d according to a control of the control unit 6, in which the oil is the working fluid.

Each of the main transmission control valves 22a, 22b, 22c, and 22d is operated selectively according to a driving signal output by the control unit 6 when a main transmission lever 8 is operated. More specifically, when the main transmission lever 8 is operated, a state of a valve is switched so that supply of oil that is the working fluid is allowed to the main transmission clutch corresponding to an operation position of the corresponding lever (the main transmission lever 8) according to a driving signal output by the control unit 6.

For example, when the main transmission lever 8 is operated to a first stage transmission side, the control unit 6 applies a driving signal to the first stage main transmission control valve 22a at the time when related information (first stage operation information) is detected. Therefore, the first stage main transmission control valve 22a is switched in a direction allowing oil supply to the first stage main transmission clutch 20a and, as a result, the first stage main transmission clutch 20a is engaged (clutch connected), so that a first stage transmission is performed.

Of course, when the main transmission lever 8 is operated, the main transmission control valves 22a to 22d respectively connected to the main transmission clutches 20a to 20d are operated such that oil supply is selectively performed according to a driving signal output by the control unit 6 according to an operation of the main transmission lever 8. Therefore, when the first stage main transmission control valve 22a is operated according to a signal of the control unit 6 and the first stage main transmission clutch 20a is engaged, other main transmission clutches 20b to 20d are maintained in a disengaged state.

The main transmission clutches 20a to 20d constituting the main transmission clutch portions 2 may also respectively be a multiple-plate type hydraulic clutch including a plurality of friction elements (reference numeral omitted). The plurality of friction elements may include at least two drive-side friction elements (clutch discs) disposed so as to be spaced apart from each other by a predetermined distance, and may include a driven-side friction element (a clutch plate) provided so as to be positioned between the drive-side friction elements.

The auxiliary transmission clutch portion 3 is connected to a second transmission hydraulic line L2 realizing a parallel arrangement in terms of a circuit with first transmission hydraulic line L1. The auxiliary transmission clutch portion 3 also includes a double pack type auxiliary transmission clutch unit 30 in which two clutches (a high speed clutch 30a and a low speed clutch 30b) operated by a hydraulic pressure are configured as one unit shape. In addition, the auxiliary transmission clutch portion 3 includes control valves (a high speed side auxiliary transmission control valve 32a and a low speed side auxiliary transmission control valve 32b) that are respectively connected to the clutches 30a and 30b constituting the auxiliary transmission clutch unit 30.

Similar to the forward-backward switching clutch portion 1 described above, the auxiliary transmission control valves 32a and 32b may respectively be a solenoid-driven type direction control valve configured to control feeding and draining of oil for the corresponding clutches 30a and 30b according to a control of the control unit 6, in which the oil is the working fluid.

when an auxiliary transmission lever 9 is operated, each of the auxiliary transmission control valves 32a and 32b is operated selectively according to a driving signal output by the control unit 6 according to an operation position of the corresponding lever (the auxiliary transmission lever 9). More specifically, the auxiliary transmission control valves 32a and 32b are configured such that supply of oil that is the working fluid is allowed to the corresponding clutch (the high speed clutch 30a or the low speed clutch 30b) according to a driving signal output by control unit 6 when the auxiliary transmission lever 9 is operated.

For example, when the auxiliary transmission lever 9 is operated to a high speed side, the control unit 6 applies a driving signal to the high speed side auxiliary transmission control valve 32a at the time when related information (high speed side operation information) is detected and, accordingly, the high speed side auxiliary transmission control valve 32a is switched in a direction allowing the oil supply to the high speed clutch 30a. As a result, the high speed clutch 30a is engaged (clutch connected), so that an additional secondary transmission is performed.

Of course, when the auxiliary transmission lever 9 is operated, the auxiliary transmission control valves 32a and 32b respectively connected to the high speed clutch 30a and the low speed clutch 30b are operated such that oil supply is selectively performed according to a driving signal output by the control unit 6 according to an operation of the auxiliary transmission lever 9. Therefore, when the high speed side auxiliary transmission control valve 32a is operated according to a signal of the control unit 6 and the high speed clutch 30a is engaged, the low speed side auxiliary transmission control valve 32b is maintained in a state in a direction of disengaging the low speed clutch 30b.

The clutches 30a and 30b constituting the auxiliary transmission clutch portion 3 may also respectively be a multiple-plate type hydraulic clutch including a plurality of friction elements (reference numeral omitted). Likewise, the plurality of friction elements may include at least two drive-side friction elements (clutch discs) disposed so as to be spaced apart from each other by a predetermined distance, and may include a driven-side friction element (a clutch plate) provided so as to be positioned between the drive-side friction elements.

The system for operating and lubricating the clutch according to an embodiment of the present disclosure includes an input line PL. The input line PL is connected to a discharge side of an oil pump P, and is connected to the discharge side of the oil pump P such that oil having a predetermined pressure discharged by the oil pump P is capable of simultaneously supplied to the first transmission hydraulic line L1 and the second transmission hydraulic line L2. Preferably, the first transmission hydraulic line L1 and the second transmission hydraulic line L2 branch out from an end of the input line PL.

The lubricating oil supply portion 5 is connected to the second transmission hydraulic line L2. Some of oil moving along the second transmission hydraulic line L2 is supplied as a lubricant to the friction elements of each clutch through the lubricating oil supply portion 5. That is, the lubricating oil supply portion 5 serves to supply some of oil that is the working fluid as the lubricant to the clutch friction elements of each of the forward-backward switching clutch portion 1, the main transmission clutch portion portions 2, and the auxiliary transmission clutch portion 3.

The lubricating oil supply portion 5 is configured such that oil is always supplied to some friction elements and oil is intermittently supplied to other friction elements. Preferably, the lubricating oil supply portion 5 is configured such that oil supply is always allowed for the clutch friction elements of each of the main transmission clutch portions 2 and the auxiliary transmission clutch portion 3, and is configured such that oil supply is intermittently allowed for the clutch friction elements of the forward-backward switching clutch portion 1 according to a control of the control unit 6.

Here, the intermittent allowance of oil has the following meaning. That is, while the forward-backward switching lever 7 is not operated, oil supply for the clutch friction elements of the forward-backward switching clutch portion 1 is blocked, and the oil supply for the corresponding clutch friction elements (the friction elements of each of the forward clutch 10a and the backward clutch 10b) is allowed 10b) for a predetermined time only when the forward-backward switching clutch portion 1 is operated by operating the forward-backward switching lever 7.

At this time, it is preferable to interpret that the operation of the forward-backward switching clutch portion 1 has the following meanings. That is, the forward control valve 12a is moved in a direction engaging or disengaging the forward clutch 10a according to an output signal of the control unit 6, and the backward control valve 12b is moved in a direction engaging or disengaging the backward clutch 10b according to an output signal of the control unit 6.

The lubricating oil supply portion 5 includes a lubricating oil supply line L3 and a clutch lubrication valve unit 52. The lubricating oil supply line L3 is branched from the second transmission hydraulic line L2 positioned in rear of the auxiliary transmission clutch portion 3 with respect to a moving direction of oil, and the clutch lubrication valve unit 52 is connected to the lubricating oil supply line L3 and is configured to regulate a flow of oil that is to be supplied as a lubricant to the clutch friction elements of each of the clutch portions 1 to 3.

The forward-backward clutch unit 10 constituting the forward-backward switching clutch portion 1 is connected to a first lubrication line L4 so that the forward-backward switching clutch portion 1 is capable of receiving oil that functions as a lubricant from the clutch lubrication valve unit 52 through the first lubrication line L4, and the clutch units 20-1, 20-2, and 30 of each of the main transmission clutch portions 2 and the auxiliary transmission clutch portion 3 are connected to a second lubrication line L5 so that the clutch units 20-1, 20-2, and 30 are capable of receiving oil that is the lubricant from the clutch lubrication valve unit 52 through the second lubrication line L5.

Figure 3:
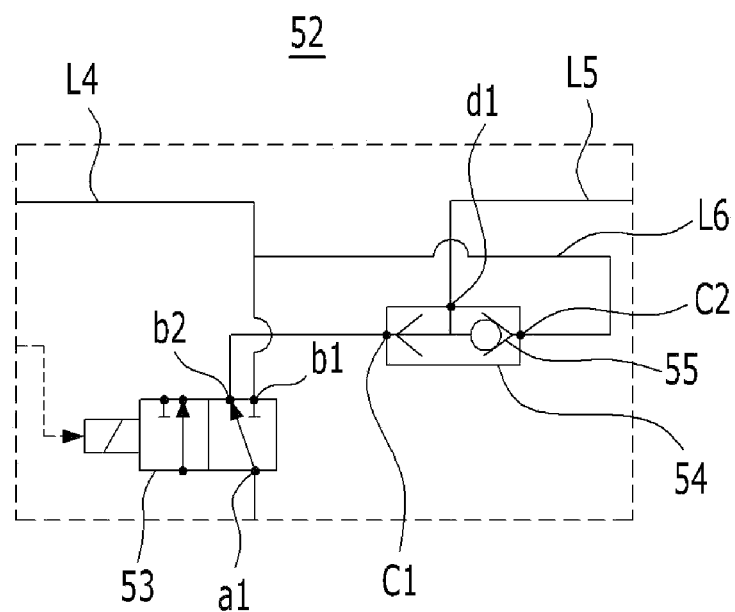
FIG. 3 is an enlarged view of a main part of the present disclosure enlarging and illustrating an 'A' portion in FIG. 1, the enlarged view enlarging and illustrating a clutch lubrication valve unit.

FIG. 3 is an enlarged view of a main part of the present disclosure enlarging and illustrating an 'A' portion in FIG. 1, the enlarged view enlarging and illustrating the clutch lubrication valve unit.

Referring to FIG. 3, the clutch lubrication valve unit 52 includes a solenoid-driven type lubrication direction control valve 53 configured to be controlled by the control unit 6 and provided with one inlet al and with two outlets b1 and b2. In addition, the clutch lubrication valve unit 52 includes an instrumental shuttle valve 54 provided with two inlets c1 and c2 and with one outlet d1, the instrumental shuttle valve 54 in which a check valve 55 configured to be operated such that oil is moved only to the outlet dl of the shuttle valve 54 is mounted at one inlet c2 of the two inlets c1 and c2.

The lubrication direction control valve 53 controlled by the control unit 6 is configured such that the first lubrication line L4 is connected to one outlet b1 among the two outlets b1 and b2 formed in the lubrication direction control valve 53, and is configured such that the other outlet b2 is directly connected or connected via a tube (a pipe or a hose) to one inlet c1 of the shuttle valve 54 positioned at an opposite side of the check valve 55. In addition, a bypass line L6 branched from the first lubrication line L4 is connected to the other inlet c2 of the shuttle valve 54 in which the check valve 55 is mounted.

As illustrated in drawings, in a non-operation state in which there is no driving signal input by the control unit 6, the lubrication direction control valve 53 may be operated such that the shuttle valve 54 and the outlet b2 are maintained to be opened, and may be operated such that the outlet b2 connected to the shuttle valve 54 is closed and the outlet b1 connected to the first lubrication line L4 is opened according to a driving signal output by the control unit 6 according to an operation of the forward-backward switching clutch portion 1.

That is, in the non-operation state in which there is no driving signal input, a switch state is maintained so that oil can flow toward the outlet b2 connected to the shuttle valve 54, and the outlet b2 connected to the shuttle valve 54 is closed and the outlet b1 connected to the first lubrication line L4 is opened by a driving signal output by the control unit 6 only when the forward-backward switching clutch portion 1 is operated by an operation of the forward-backward switching lever 7.

For example, when the forward-backward switching lever 7 is operated in a forward direction, the control unit 6 applies a driving command for engaging the forward clutch 10a to the forward control valve 12a and, at the same time, applies a driving signal to the lubrication direction control valve 53. Accordingly, since the forward clutch 10a is engaged and the outlet b1 toward the first lubrication line L4 of the lubrication control valve 53 is opened, oil as a lubricant is supplied to the friction elements of the forward clutch 10a and the backward clutch 10b.

An operation of the clutch lubrication valve unit 52 including the lubrication direction control valve 53 will be described later in more detail with reference to FIGS. 4 and 5.

Meanwhile, in FIG. 1, reference numeral 4 refers to a pressure-flow control unit. The pressure-flow control unit 4 is mounted at a point at which the lubricating oil supply portion 5 is connected to the second transmission hydraulic line L2 in terms of a circuit, and is configured such that a required flow rate is supplied to the lubricating oil supply portion 5 while a pressure of a circuit is maintained at a pressure required for a clutch engagement of each of the clutch portions described above.

Preferably, in the pressure-flow control unit 4 applied in an embodiment of the present disclosure, a flow regulating valve 42 having one inlet and two outlets and having an inner portion provided with an orifice and a relief valve 40 disposed in front of the flow regulating valve 42 with respect to a moving direction of oil are configured as one valve unit shape.

In FIG. 1, reference numeral T that is not described refers to an oil tank in which oil that is the working fluid is stored.

An operation of a lubrication of the transmission clutch performed by the system of operating and lubricating the clutch according to an embodiment of the present disclosure will be described with reference to the hydraulic circuit diagram.

Figure 4:
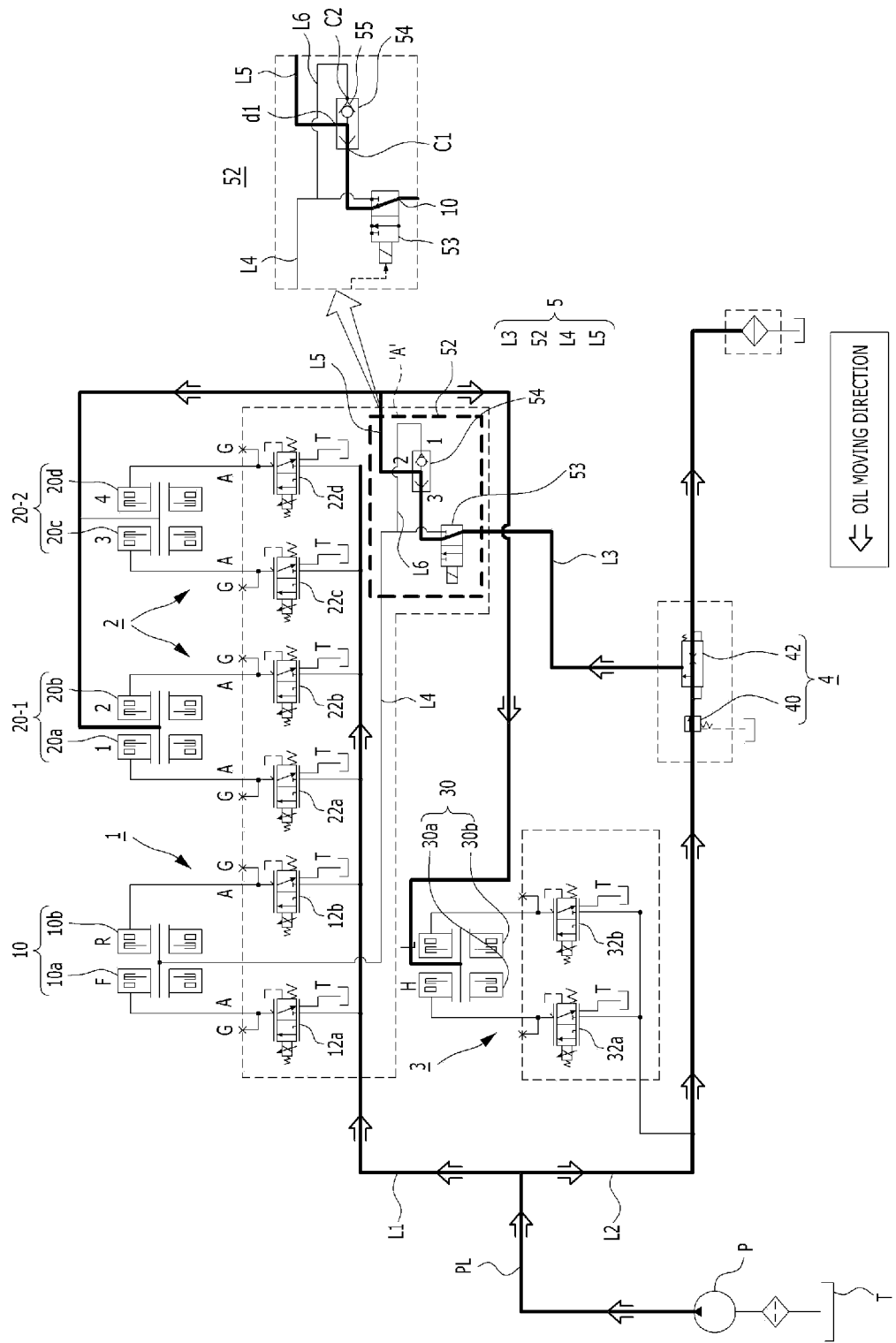
FIG. 4 is an operation state view illustrating a flow of oil when a forward-backward switching clutch portion is not operated.
Figure 5:
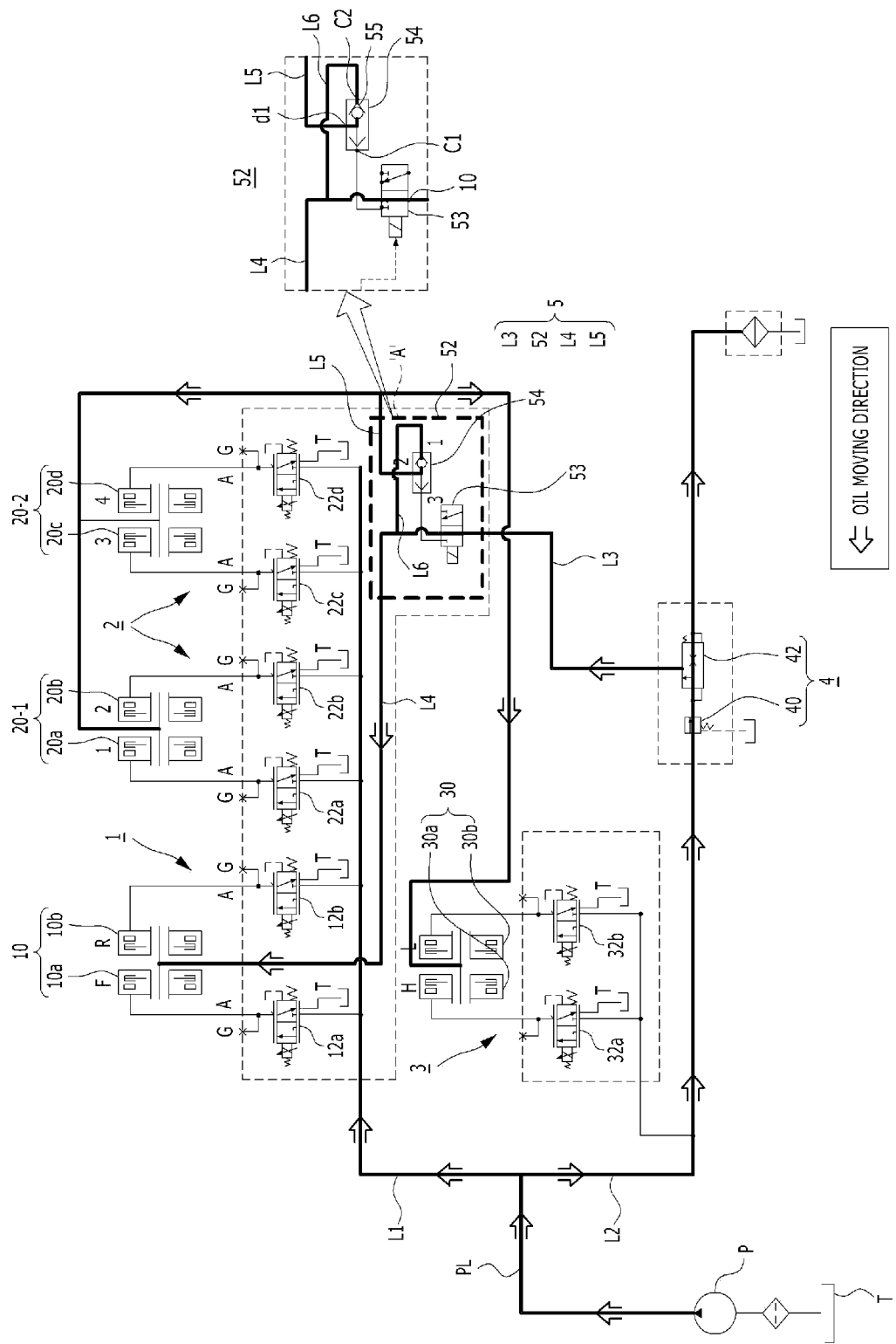
FIG. 5 is an operation state view illustrating a flow of oil when the forward-backward switching clutch portion is operated.

FIGS. 4 and 5 are operation state views of the present disclosure, FIG. 4 is an operation state view illustrating a flow of oil when a forward-backward switching clutch portion is not operated, and FIG. 5 is an operation state view illustrating a flow of oil when the forward-backward switching clutch portion is operated.

Referring to FIG. 4, the flow of oil when the forward-backward switching clutch portion is not operated will be described.

Referring to FIG. 4, when the oil pump P is driven, oil at a predetermined pressure is supplied to the first transmission hydraulic line L1 and the second transmission hydraulic line L2 through the input line PL. The oil supplied to each of the first transmission hydraulic line L1 and the second transmission hydraulic line L2 is supplied as a working fluid for operating the forward-backward switching clutch portion 1, the main transmission clutch portions 2, and the auxiliary transmission clutch portion 3 according to a switch state of each control valve according to a lever control.

For example, when the main transmission lever is operated to the first stage transmission side, and the auxiliary transmission lever 9 is operated to the high speed side, by the control of the control unit 6, the first stage main transmission control valve 22a is switched in a direction allowing oil supply to the first stage main transmission clutch 20a, and the high speed side auxiliary transmission control valve 32a is switched in a direction allowing oil supply to the high speed clutch 30a. Accordingly, the oil is supplied as the working fluid that engages the first stage main transmission clutch 20 and the high speed clutch 30a to corresponding clutches.

Here, by the oil tank and the pressure-flow control unit 5 that is positioned at the middle of the second transmission hydraulic line L2, each pressure of the first transmission hydraulic line L1 and the second transmission hydraulic line L2 is maintained at a pressure value required to engage the clutches of each of the clutch portions 1 to 3 In addition, some of oil flowing along the second transmission hydraulic line L2 is moved to the lubricating oil supply portion 5 by a flow adjustment operation performed by the pressure-flow control unit 5.

The lubrication direction control valve 53 of the clutch lubrication valve unit 52 constituting the lubricating oil supply portion 5 is operated only for a predetermined time according to a control of the control unit 6 at the time when the forward-backward clutch unit 10 is operated by operating the forward-backward switching lever 7 (at the time when the forward clutch 10a or the backward clutch 10b is engaged or at the time when the corresponding clutch in the engaged stage is disengaged), and is maintained in the valve switch state as illustrated in the partially enlarged view of FIG. 4 at other times.

Accordingly, the supplied oil sequentially passes through the lubricating oil supply line L3, the lubrication direction control valve 53, the shuttle valve 54, and the second lubrication line L5, and is supplied as a lubricant to each of the friction elements of the clutch units 20-1, 20-2, and 30 constituting the main transmission clutch portions 2 and the auxiliary transmission clutch portion 3. As a result, wear of the corresponding friction elements may be prevented by a lubricating action of the oil and a frictional heat of the friction elements may be reduced by a cooling action of the oil, so that a clutch performance may be properly maintained.

Next, the oil flow when the forward-backward switching clutch portion is operated will be described with reference to FIG. 5.

As described above, the lubrication direction control valve 53 is operated by a driving signal of the control unit 6 output only when the forward-backward switching clutch portion 1 is operated by operating the forward-backward switching lever 7. More specifically, the lubrication direction control valve 53 is operated such that a flow path is formed toward the outlet b1 connected to the first lubrication line L4 as illustrated in the partially enlarged view in FIG. 5 according to a driving signal of the control unit 6 output at the time when the forward-backward switching clutch portion 1 is operated.

For example, when the forward-backward switching lever 7 is operated in the forward direction, the control unit 6 applies a driving command for engaging the forward clutch 10a to the forward control valve 12a and, at the same time, applies a driving signal to the lubrication direction control valve 53. Accordingly, the forward clutch 10a is engaged, the lubrication direction control valve 53 closes a flow path in a direction connected to the shuttle valve 54 and opens a flow path in a direction connected to the first lubrication line L4.

According to the flow path switching of the lubrication direction control valve 53, some of oil sequentially passes through the lubricating oil supply line L3, the lubrication direction control valve 53, and the first lubrication line L4, and is supplied as a lubricant for cooling and reducing friction to each of the friction elements of the clutch unit 10 constituting the forward-backward switching clutch portion 1. At this time, the bypass line L6 is branched from the first lubrication line L4, and the bypass line L6 is connected to a second side inlet of the shuttle valve 54.

Therefore, the other oil is indirectly supplied to the shuttle valve 54 via the first lubrication line L4 and the bypass line L6, and the indirectly supplied oil pushes and opens the check valve 55 at the second side inlet of the shuttle valve 54 and is moved inside the shuttle valve 54. In addition, the other oil is supplied as a lubricant to each of the friction elements of the clutch units 20-1, 20-2, and 30 constituting the main transmission clutch portions 2 and the auxiliary transmission clutch portion 3 through the outlet dl of the shuttle valve 54 and the second lubrication line L5.

That is, in the present disclosure, oil functioning as a lubricant is always supplied to the friction clutch elements of the main transmission clutch portions 2 and the friction clutch elements of the auxiliary transmission clutch portion 3 regardless of whether the forward-backward switching clutch portion 1 is operated, and oil supply is intermittently allowed only in a specific condition (in a case in which the forward-backward switching clutch portion 1 is operated) to the clutch friction elements of the forward-backward switching clutch portion 1 and the corresponding friction elements are lubricated and cooled.

According to an embodiment of the present disclosure described above, oil is always supplied to the clutch friction elements of each of the main transmission clutch portion and the auxiliary transmission clutch portion having a relatively low operation sensitivity and a high frequency of use so that the corresponding clutch friction elements are lubricated and cooled, and oil as a lubricant is intermittently supplied to the clutch friction elements of the forward-backward switching clutch portion having a relatively high operation sensitivity and a low frequency of use so that the corresponding clutch friction elements are lubricated and cooled.

In clutches of a hydraulic transmission, a forward-backward switching clutch is required to be operated more sensitively than other clutches due to characteristics of the forward-backward switching clutch. In addition, a frequency of use of the forward-backward switching clutch is relatively low comparing to other clutches. Therefore, in a conventional technology in which the forward-backward switching clutch is always lubricated like other clutches, there is a problem that excessive lubrication causes a malfunction due to drag or slip and the excessive lubrication adversely affects a clutch performance.

In the present disclosure, since the system of the present disclosure is configured such that oil that is a lubricant is supplied intermittently, unlike other clutch portions, to the clutch friction element of the forward-backward switching clutch portion having a relatively high operation sensitivity and a relatively low frequency of use, the problem of the conventional technology in which excessive lubrication of the forward-backward switching clutch portion causes a malfunction due to drag or slip and the excessive lubrication adversely affects a clutch performance may be prevented.

In the detailed description of the present disclosure described above, only a specific embodiment was described. However, the present disclosure should not be construed as being limited to the specific embodiment described above, but should be construed as including all changes, equivalents, and substitutions within the spirit of the present disclosure defined in the claims.

What is claimed is:

1. A system for operating and lubricating a clutch of a work vehicle, the system comprising:
   a forward-backward switching clutch portion connected to a first transmission hydraulic line;
   a main transmission clutch portion connected to the first transmission hydraulic line such that the main transmission clutch portion is disposed in parallel with the forward-backward switching clutch portion in terms of a circuit;
   an auxiliary transmission clutch portion connected to a second transmission hydraulic line that is disposed in parallel with the first transmission hydraulic line in terms of the circuit; and
   a lubricating oil supply portion configured to supply oil as a lubricant supplied from the second transmission hydraulic line to each clutch friction element of the forward-backward switching clutch portion, the main transmission clutch portion, and the auxiliary transmission clutch portion,
   wherein the lubricating oil supply portion is configured such that oil supply to the clutch friction element of the main transmission clutch portion and to the clutch friction element of the auxiliary transmission clutch portion is always allowed and oil supply to the clutch friction element of the forward-backward switching clutch portion is intermittently allowed according to control of a control unit.

2. The system of claim 1, further comprising an input line configured to supply oil to the first transmission hydraulic line and the second transmission hydraulic line, the oil being discharged from an oil pump and having a predetermined pressure,
   wherein the first transmission hydraulic line and the second transmission hydraulic line branch out from an end of the input line.

3. The system of claim 1, wherein each of the forward-backward switching clutch portion, the main transmission clutch portion, and the auxiliary transmission clutch comprises:
   at least one double pack type clutch unit; and
   solenoid-driven type control valves provided at each clutch constituting the clutch unit, the control valves being configured to regulate feeding and draining of oil that is a working fluid according to control of the control unit.

4. The system of claim 1, wherein the lubricating oil supply portion is configured to allow oil supply to the clutch friction element of the forward-backward switching clutch portion according to a driving signal output by the control unit when the forward-backward switching clutch portion is operated.

5. The system of claim 1, wherein the lubricating oil supply portion comprises:
   a lubricating oil supply line that branches out from the second transmission hydraulic line positioned in rear of the auxiliary transmission clutch portion with respect to a moving direction of oil;
   a clutch lubrication valve unit connected to the lubricating oil supply line and configured to regulate flow of oil that is to be supplied as the lubricant to the clutch friction elements of each of the forward-backward switching clutch portion, the main transmission clutch portion, and the auxiliary transmission clutch portion;
   a first lubrication line connecting the clutch lubrication valve unit to a clutch unit of the forward-backward switching clutch portion; and
   a second lubrication line connecting the clutch lubrication valve unit to each clutch unit of the main transmission clutch portion and the auxiliary transmission clutch portion.

6. The system of claim 5, wherein the clutch lubrication valve unit comprises:
   a solenoid-driven type lubrication direction control valve having one inlet and two outlets; and
   a shuttle valve having two inlets and one outlet, the shuttle valve in which a check valve configured to be operated such that oil is moved only to the outlet of the shuttle valve is mounted at one of the two inlets,
   wherein the first lubrication line is connected to one of the two outlets of the lubrication direction control valve, and the other of the two outlets of the lubrication direction control valve is connected to one inlet of the shuttle valve positioned at an opposite side of the check valve,
   a bypass line that branches out from the first lubrication line is connected to the other of the two inlets of the shuttle valve in which the check valve is mounted, and the second lubrication line is connected to the outlet of the shuttle valve.

7. The system of claim 6, wherein the lubrication direction control valve is configured to be switched so that the outlet of the lubrication direction control valve toward the first lubrication line is opened according to a driving signal output by the control unit in conjunction with an operation of the forward-backward switching clutch portion.

8. The system of claim 1, further comprising a pressure-flow control unit mounted at a point where the lubricating oil supply portion is connected to the second transmission hydraulic line in terms of a circuit, the pressure-flow control unit being configured to form a pressure for a clutch engagement of the forward-backward switching clutch portion, the main transmission clutch portion, and the auxiliary transmission clutch portion, and the pressure-flow control unit being configured to supply a required flow rate to the lubricating oil supply portion.

9. The system of claim 8, wherein, in the pressure-flow control unit, a flow regulating valve having one inlet and two outlets and having an inner portion provided with an orifice and a relief valve disposed in front of the flow regulating valve with respect to a moving direction of oil are configured as one valve unit shape.

\* \* \* \* \*